US012559159B2

(12) United States Patent
Seo

(10) Patent No.: US 12,559,159 B2
(45) Date of Patent: Feb. 24, 2026

---

(54) STEER-BY-WIRE STEERING APPARATUS

(71) Applicant: HL MANDO CORPORATION,
Gyeonggi-do (KR)

(72) Inventor: Donghwan Seo, Gyeonggi-do (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 1016 days.

(21) Appl. No.: 17/761,082

(22) PCT Filed: Sep. 11, 2020

(86) PCT No.: PCT/KR2020/012298
§ 371 (c)(1),
(2) Date: Mar. 16, 2022

(87) PCT Pub. No.: WO2021/054681
PCT Pub. Date: Mar. 25, 2021

(65) Prior Publication Data
US 2022/0355853 A1     Nov. 10, 2022

(30) Foreign Application Priority Data

Sep. 17, 2019     (KR) ........................ 10-2019-0113877

(51) Int. Cl.
*B62D 5/00*          (2006.01)
*B62D 5/04*          (2006.01)
(52) U.S. Cl.
CPC ........... *B62D 5/001* (2013.01); *B62D 5/0424*
(2013.01); *B62D 5/046* (2013.01)

(58) Field of Classification Search
CPC ...... B62D 5/001; B62D 5/0424; B62D 5/046;
B62D 5/0445; B62D 5/0412; B62D 5/04;
(Continued)

(56) References Cited

U.S. PATENT DOCUMENTS

| | | | |
|---|---|---|---|
| 2013/0126261 A1 | 5/2013 | Jung et al. | |
| 2019/0092374 A1 | 3/2019 | Nofzinger | |
| 2020/0023885 A1* | 1/2020 | Choi ...................... | B62D 5/003 |

FOREIGN PATENT DOCUMENTS

| | | |
|---|---|---|
| CN | 107031700 | 8/2017 |
| DE | 10 2017 128 739 | 6/2018 |

(Continued)

OTHER PUBLICATIONS

Office Action dated Apr. 23, 2024 for Korean Patent Application No.
10-2019-0113877 and its English translation provided by the Appli-
cant's foreign counsel.

(Continued)

*Primary Examiner* — Valentin Neacsu
*Assistant Examiner* — Abigail R Hymel
(74) *Attorney, Agent, or Firm* — WOMBLE BOND
DICKINSON (US) LLP

(57)          ABSTRACT

In a steer-by-wire steering apparatus according to embodi-
ments of the present invention, a structure for preventing
rotation of a sliding bar in order to allow the sliding bar to
slide in the axial direction by the torque of a motor or a
structure for determining a position to which the sliding bar
moves can be more simply implemented, whereby the
number of components can be reduced, the assembly pro-
cess can be simplified, and the cost can be significantly
reduced.

17 Claims, 17 Drawing Sheets

100

(58) Field of Classification Search

CPC ...... B62D 5/0403; B62D 5/0409; B62D 1/20; B62D 3/12; B62D 3/02; B62D 3/126; F16H 55/26

USPC ......................................................... 180/402

See application file for complete search history.

(56) References Cited

FOREIGN PATENT DOCUMENTS

| | | |
|---|---|---|
| JP | 9-202249 | 8/1997 |
| JP | 2002-145084 | 5/2002 |
| JP | 2006-201025 | 8/2006 |
| JP | 2007-83790 | 4/2007 |
| JP | 2008-74260 | 4/2008 |
| JP | 2008-265590 | 11/2008 |
| JP | 2009-241660 | 10/2009 |
| JP | 2010-47158 | 3/2010 |
| JP | 2016-121876 | 7/2016 |
| JP | 2017-100672 | 6/2017 |
| JP | 2019-74416 | 5/2019 |
| KR | 10-2008-0078985 | 8/2008 |
| KR | 10-1398091 | 5/2014 |
| KR | 10-2016- 0014800 | 2/2016 |
| KR | 10-2019-0047883 | 5/2019 |
| KR | 10-2019-0104672 | 9/2019 |

OTHER PUBLICATIONS

Notice of Allowance dated May 1, 2024 for Chinese Patent Application No. 202080065210.2 and its English translation by Google Translate.

Wang, Xiao-long et al.: "Research the Parameters Optimization Design of Coupling Coil for Passive LC Sensors", vol. 14 No. 34, Dec. 2014, pp. 1-4.

Office Action dated Nov. 24, 2023 for Chinese Patent Application No. 202080065210.2 and its English translation by Google Translate.

International Preliminary Report on Patentability (Chapter I) for PCT/KR2020/012298 issued on Mar. 15, 2022 and its English translation from WIPO (now published as WO 2021/054681).

International Search Report for PCT/KR2020/012298 mailed on Dec. 9, 2020 (now published as WO 2021/054681) with English translation provided by WIPO.

Written Opinion of the International Searching Authority for PCT/KR2020/012298 mailed on Dec. 9, 2020 (now published as WO 2021/054681) with English translation provided by Google Translate.

* cited by examiner

STEER-BY-WIRE STEERING APPARATUS

TECHNICAL FIELD

The present embodiments relate to a steer-by-wire steering device and, more specifically, a steer-by-wire steering device capable of reducing the number of components, simplifying the assembly process, and significantly saving costs by implementing, with a simpler structure, preventing rotation of the sliding bar and determining the moving position of the sliding bar to allow the sliding bar to axially slide by the torque of a motor.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

Conventional steer-by-wire steering devices have a pinion shaft that rotates, meshing with a rack bar, and prevents rotation of the rack bar and determines the moving position of the rack bar to allow the rack bar to axially slide by a motor. To have a pinion shaft, it is required to process the rack gear and to further have a support yoke, which increases the number of necessary components and complicates the assembly process, thus leading to inefficiency.

DETAILED DESCRIPTION OF THE INVENTION

Technical Problem

The present embodiments have been conceived in the foregoing background and relate to a steer-by-wire steering device capable of reduce the number of components, simplifying the assembly process, and significantly saving costs by implementing, with a simpler structure, preventing rotation of the sliding bar and determining the moving position of the sliding bar to allow the sliding bar to axially slide by the torque of a motor.

Technical Solution

According to the present embodiments, there may be provided a steer-by-wire steering device, comprising a sliding bar provided to be axially slidable in a housing, a motor connected with the sliding bar by a gear box, and an anti-rotation member formed with a hollow, circumferentially supported by the sliding bar, and coupled to an inner circumferential surface of the housing.

Advantageous Effects

The present embodiments may reduce the number of components, simplify the assembly process, and significantly save costs by implementing, with a simpler structure, preventing rotation of the sliding bar and determining the moving position of the sliding bar to allow the sliding bar to axially slide by the torque of a motor.

MODE FOR CARRYING OUT THE INVENTION

Figure 1:
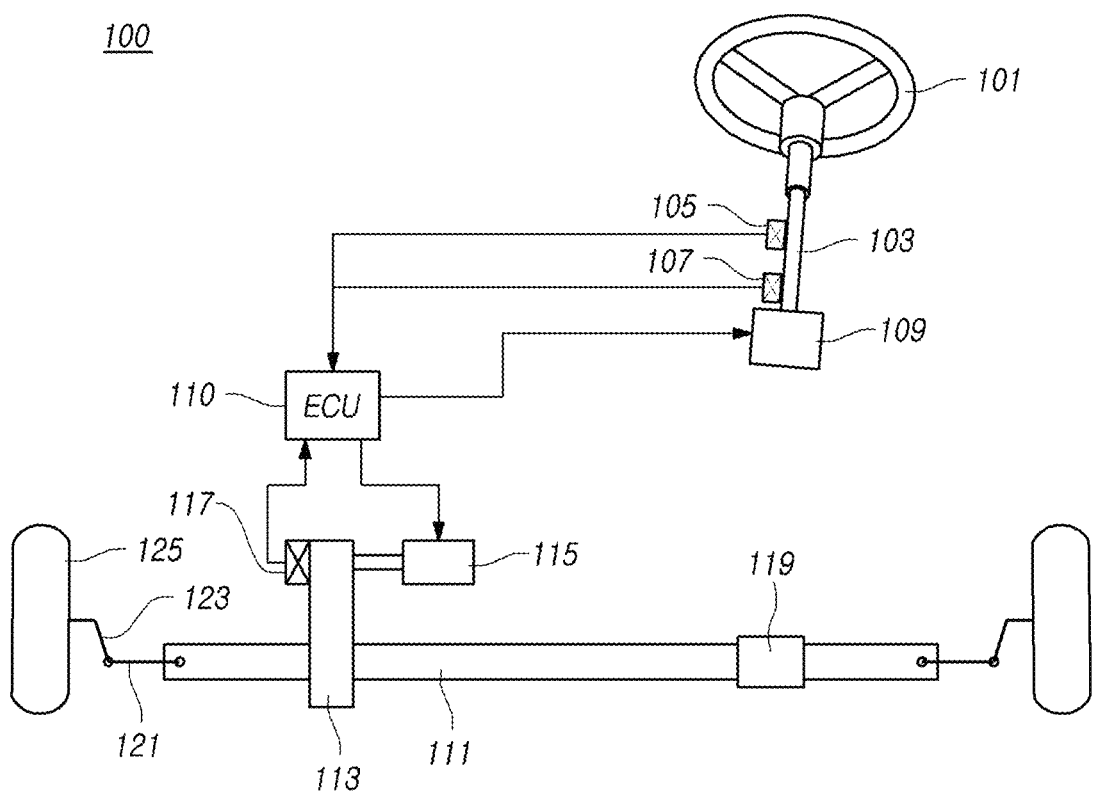
FIG. 1 is a view schematically illustrating a steer-by-wire steering device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
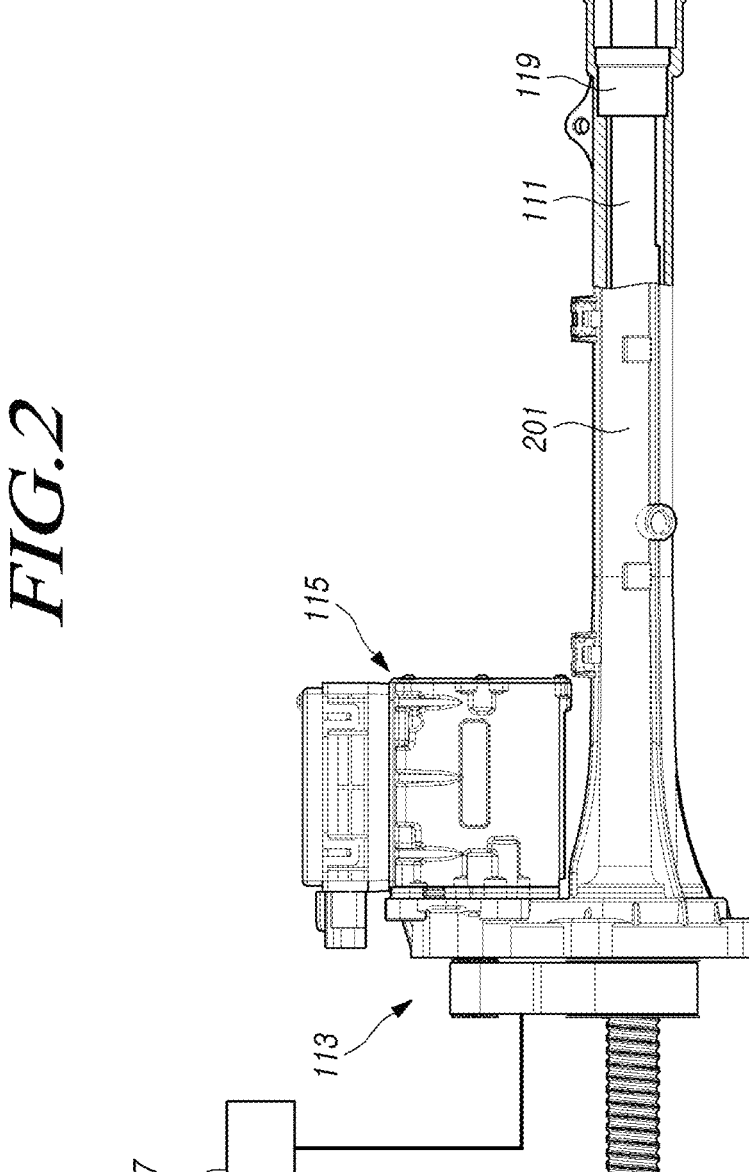
FIG. 2 is a side view illustrating a steer-by-wire steering device according to the present embodiments.
Figure 3:
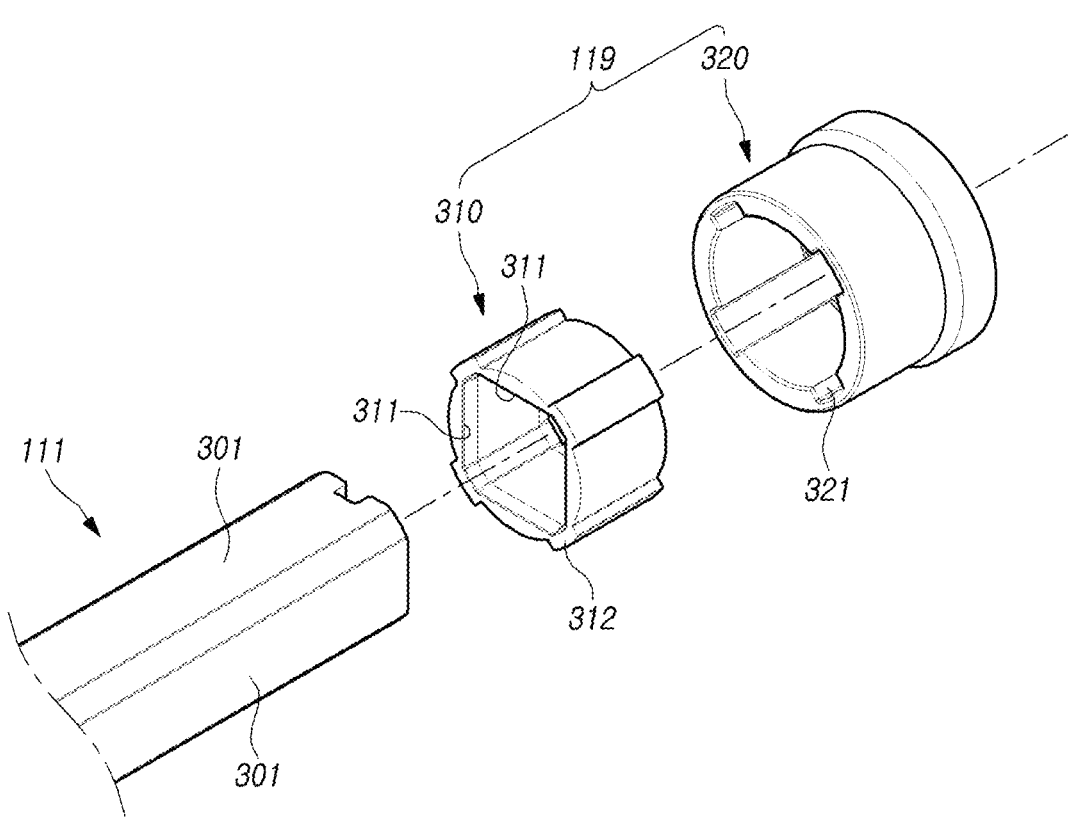
FIG. 3 is an exploded perspective view illustrating a portion of a steer-by-wire steering device according to an embodiment.
Figure 4:
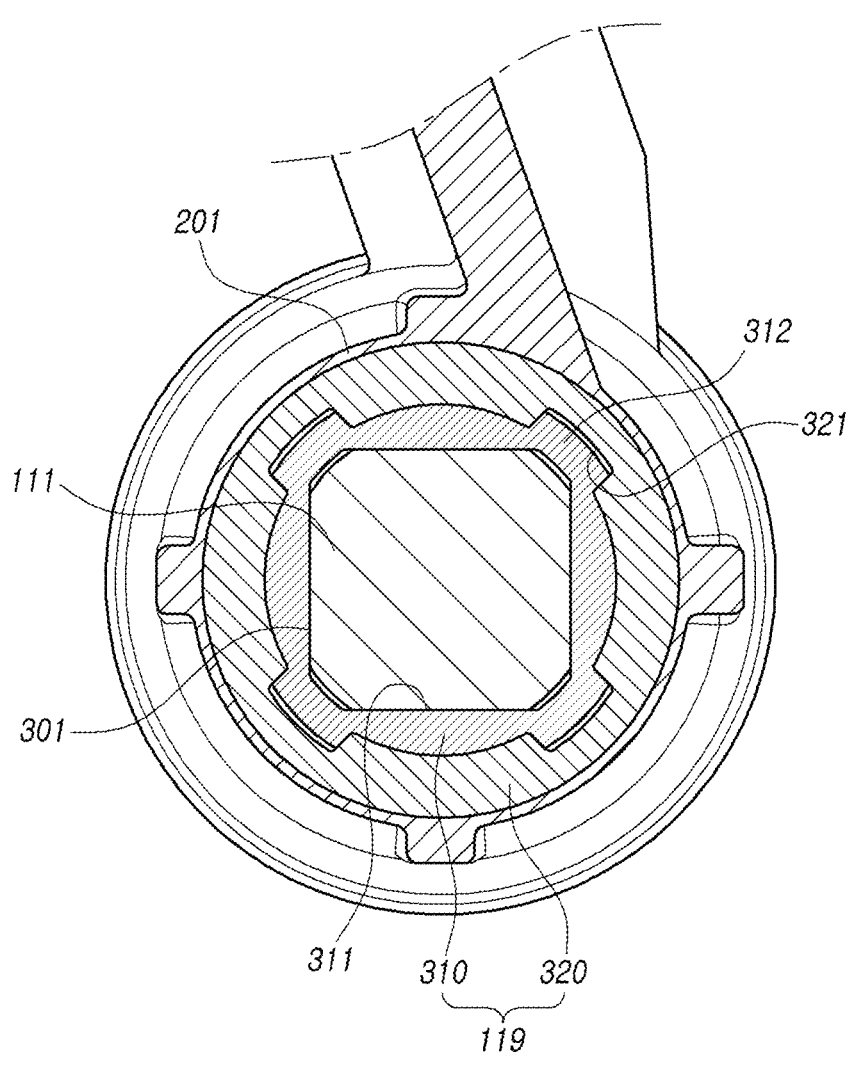
FIGS. 4 and 5 are cross-sectional views illustrating a steer-by-wire steering device according to an embodiment.
Figure 5:
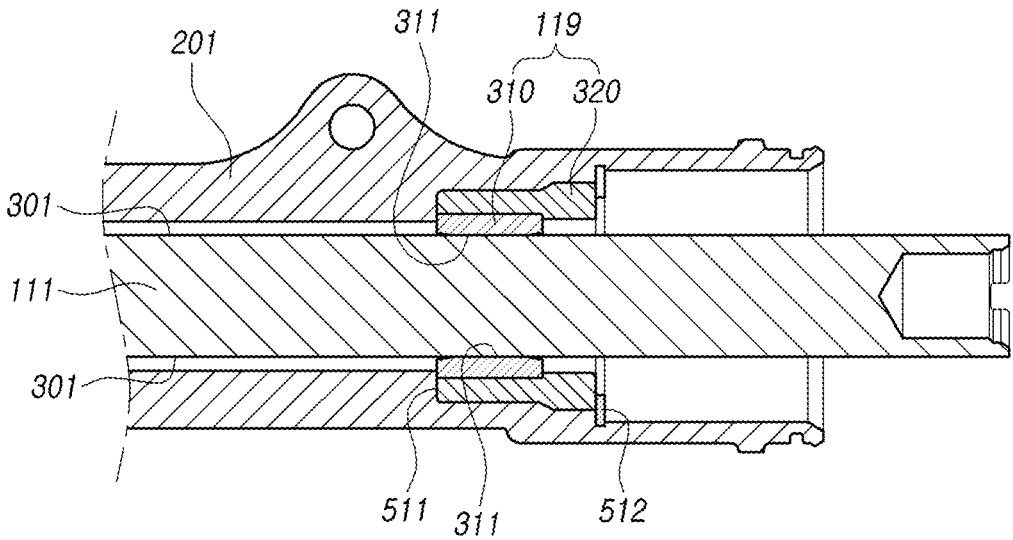
Figure 6:
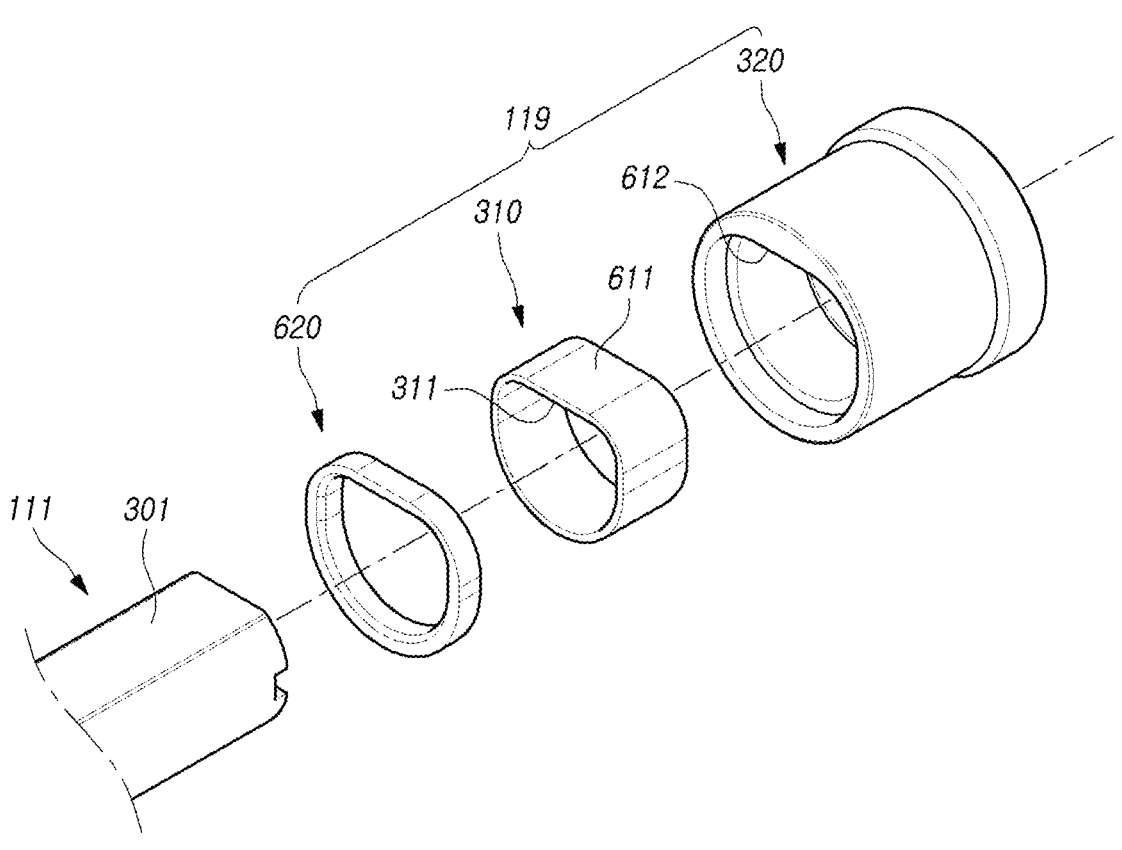
FIG. 6 is an exploded perspective view illustrating a portion of a steer-by-wire steering device according to an embodiment.
Figure 7:
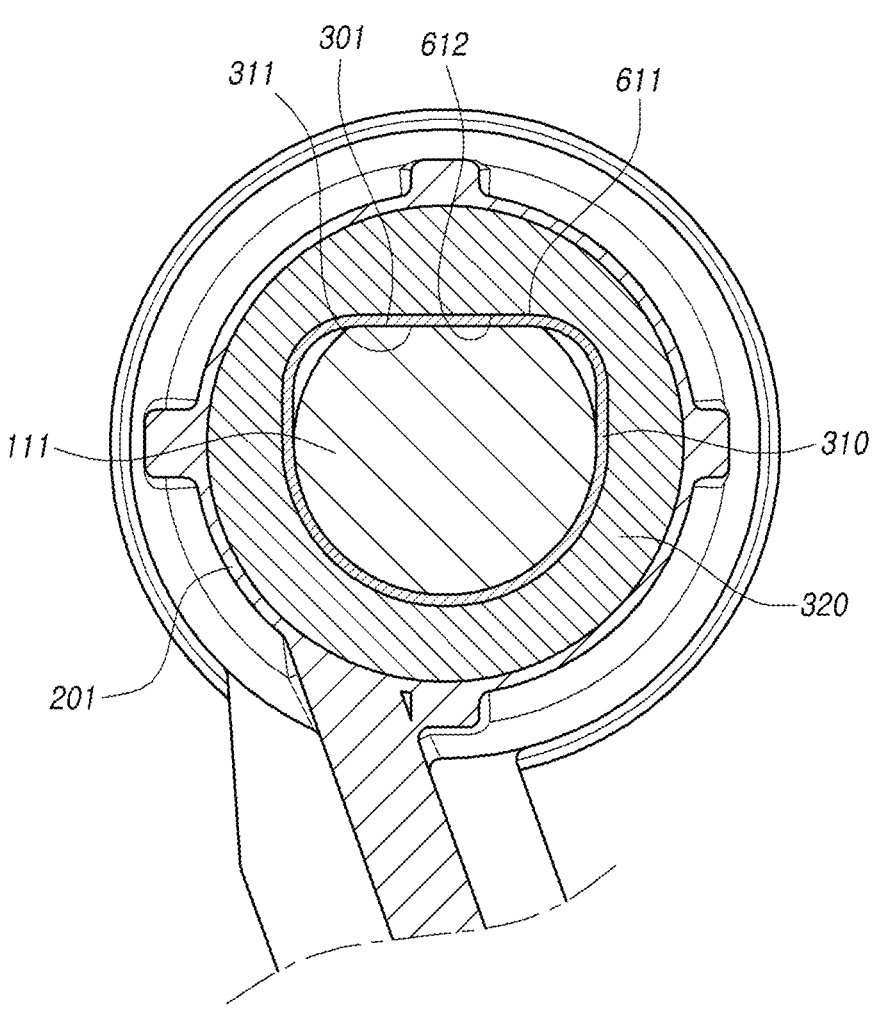
FIGS. 7 and 8 are cross-sectional views illustrating a steer-by-wire steering device according to the present embodiments.
Figure 8:
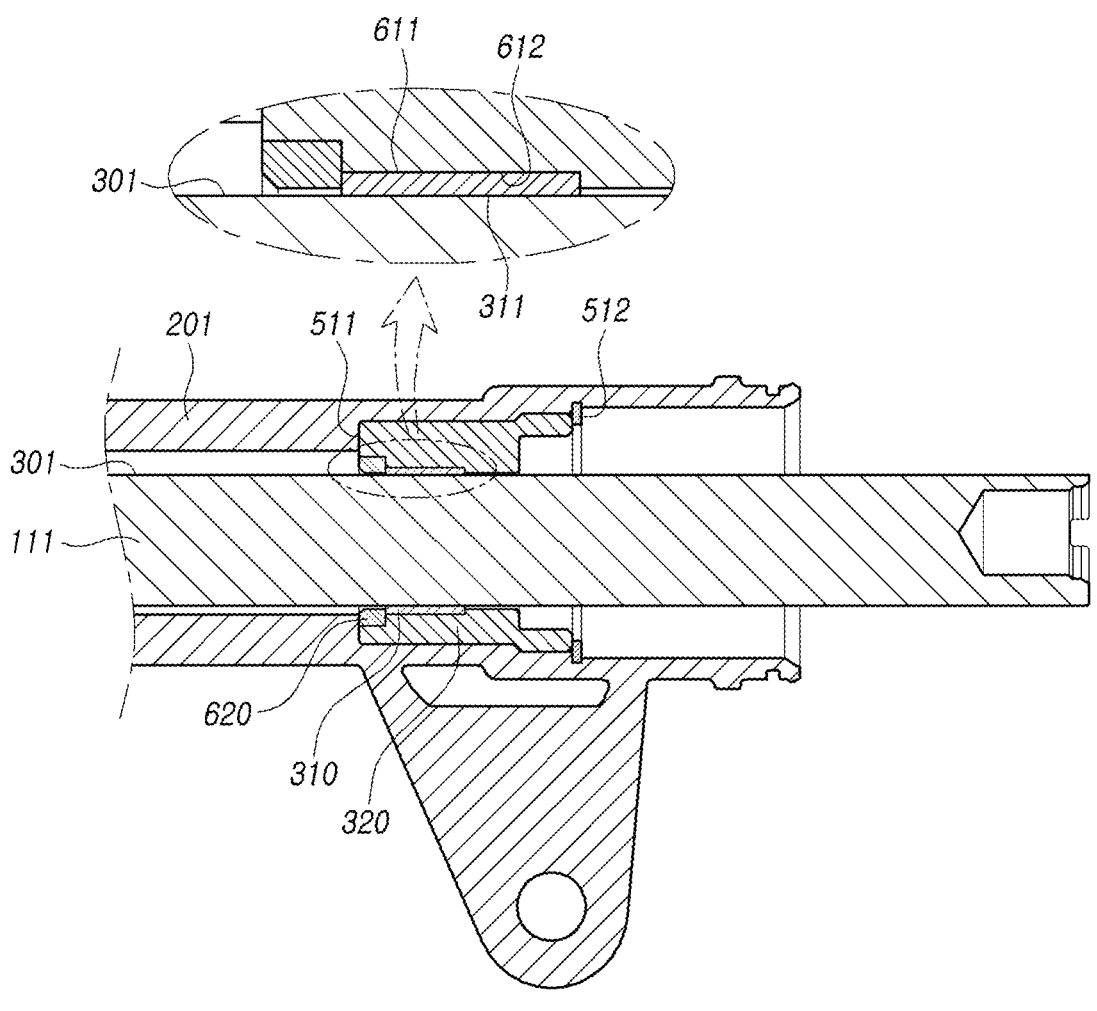
Figure 9:
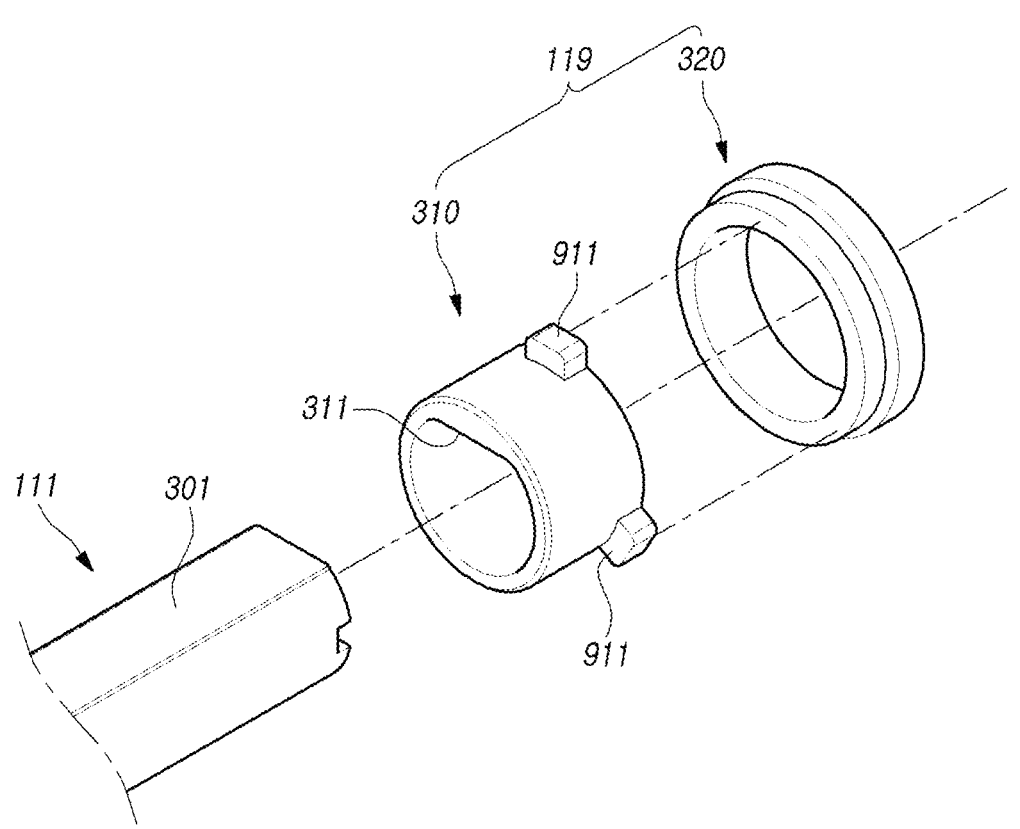
FIG. 9 is an exploded perspective view illustrating a portion of a steer-by-wire steering device according to an embodiment.
Figure 10:
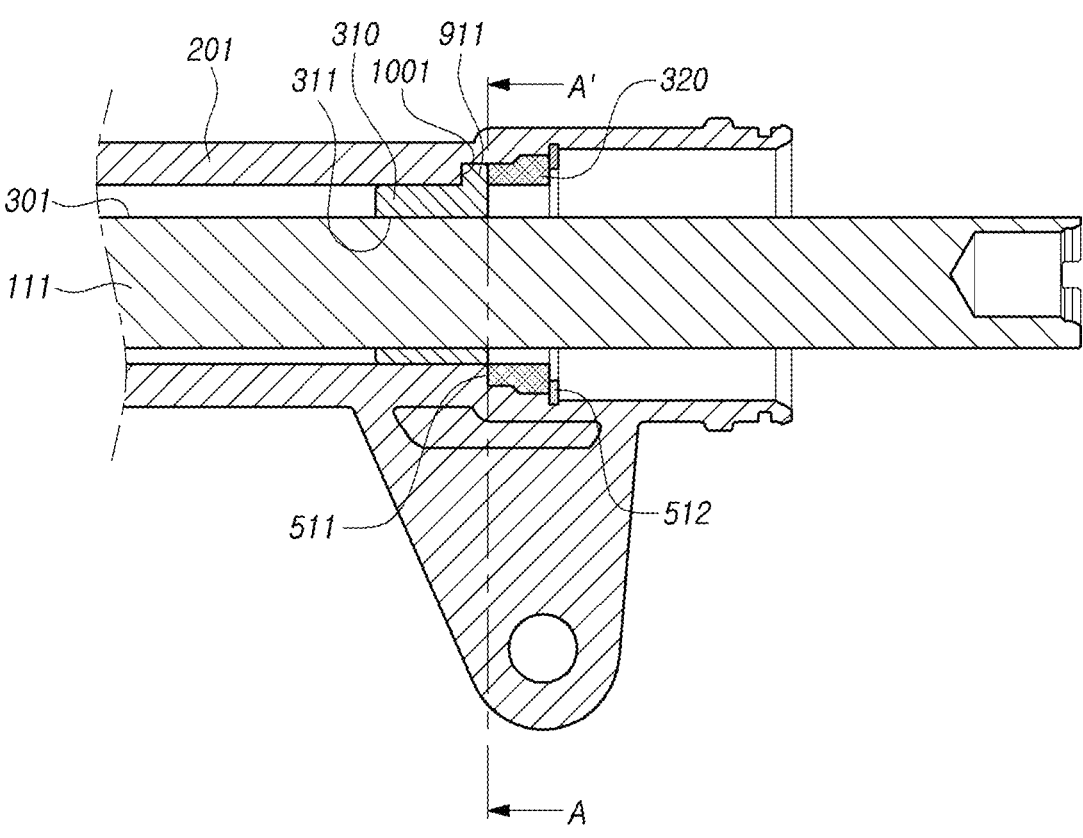
FIG. 10 is a cross-sectional view illustrating a steer-by-wire steering device according to the present embodiments.
Figure 11:
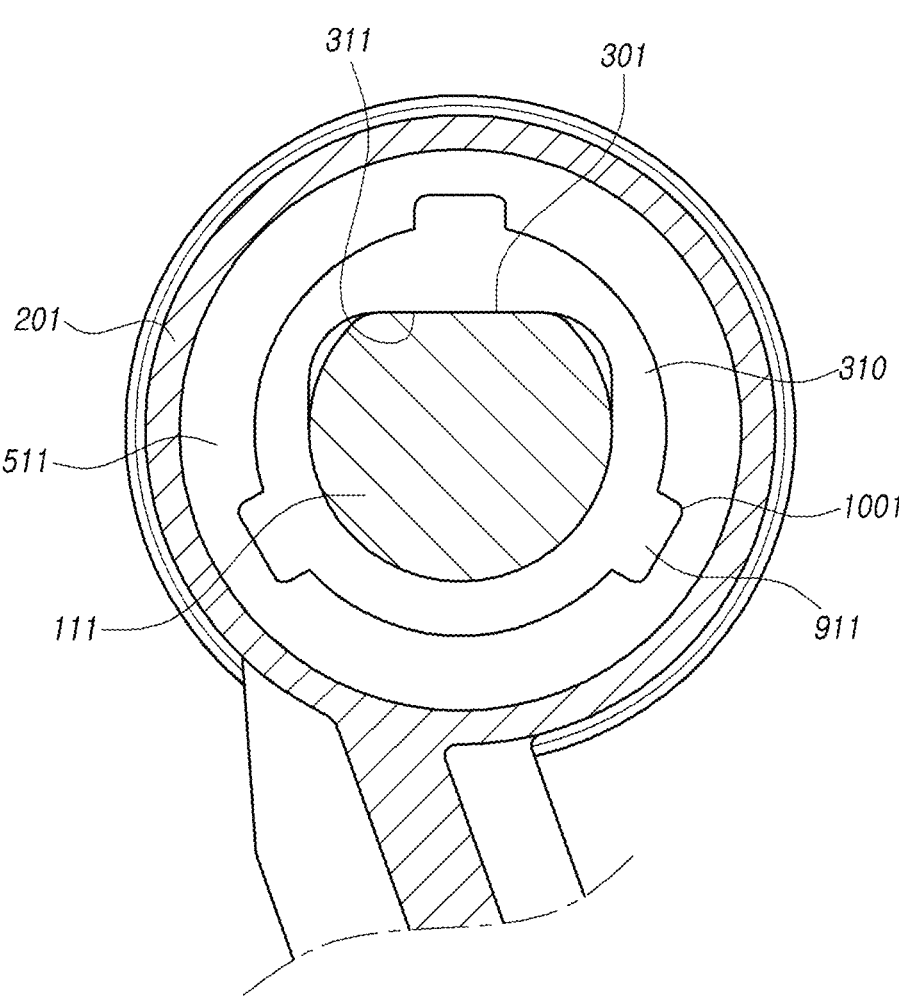
FIG. 11 is a cross-sectional view taken along a line A-A' of FIG. 10 according to the present embodiments.
Figure 12:
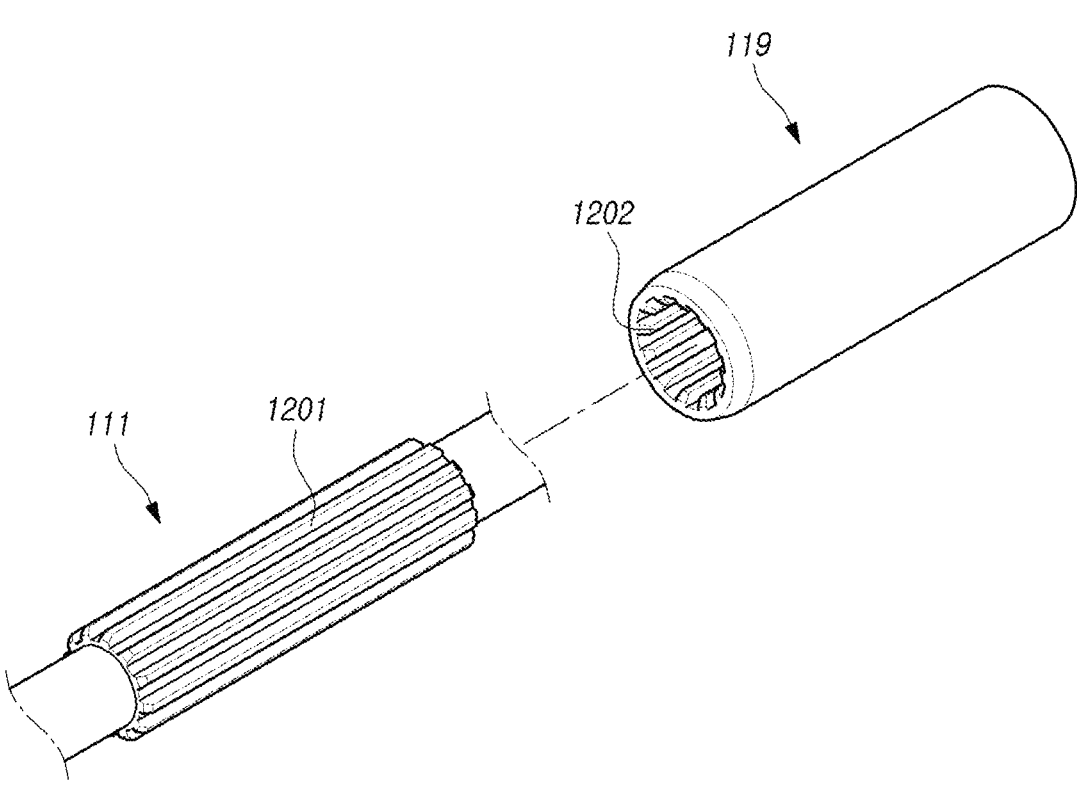
FIG. 12 is an exploded perspective view illustrating a portion of a steer-by-wire steering device according to an embodiment.
Figure 13:
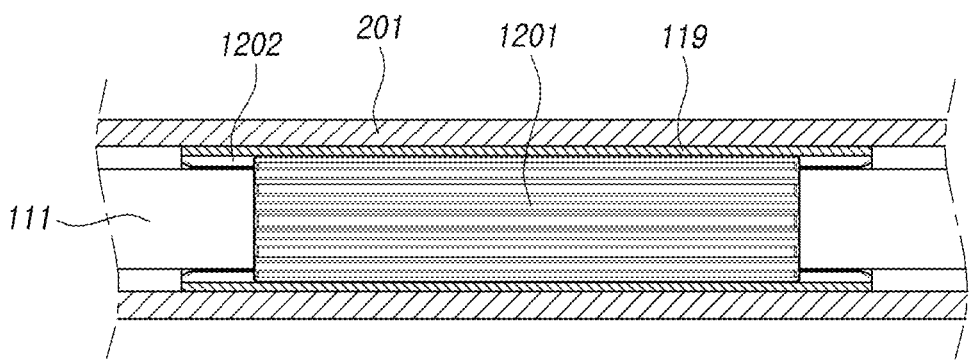
FIG. 13 is a cross-sectional view illustrating a steer-by-wire steering device according to the present embodiments.
Figure 14:
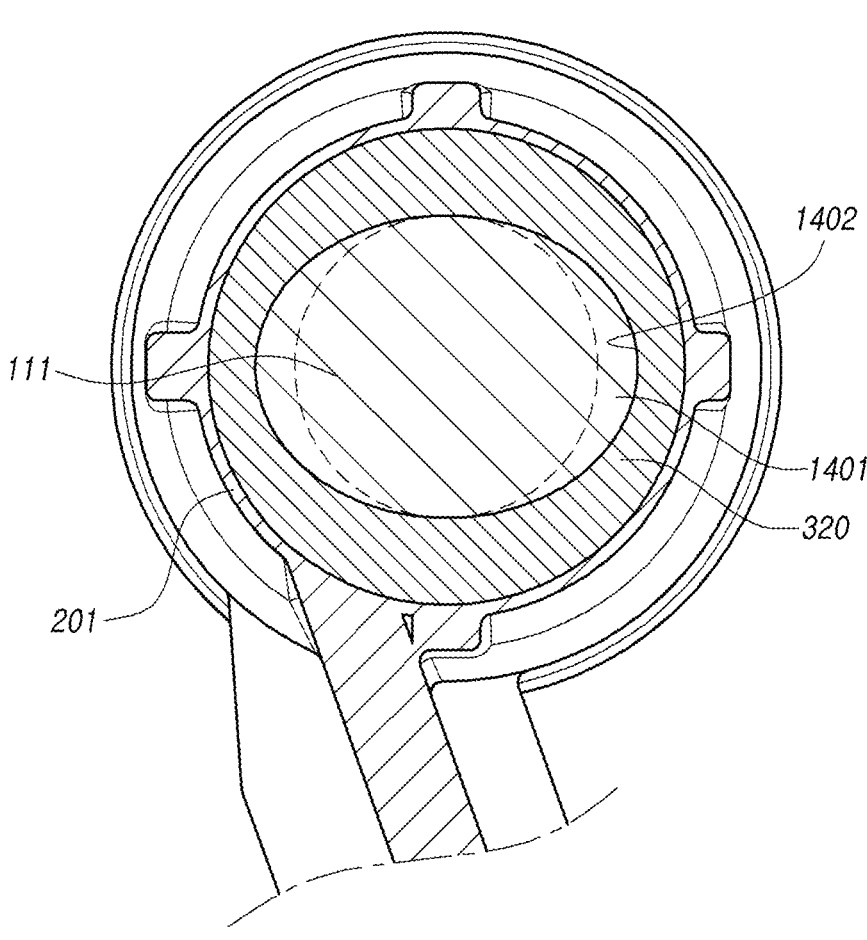
FIGS. 14 and 15 are cross-sectional views illustrating a steer-by-wire steering device according to an embodiment.
Figure 15:
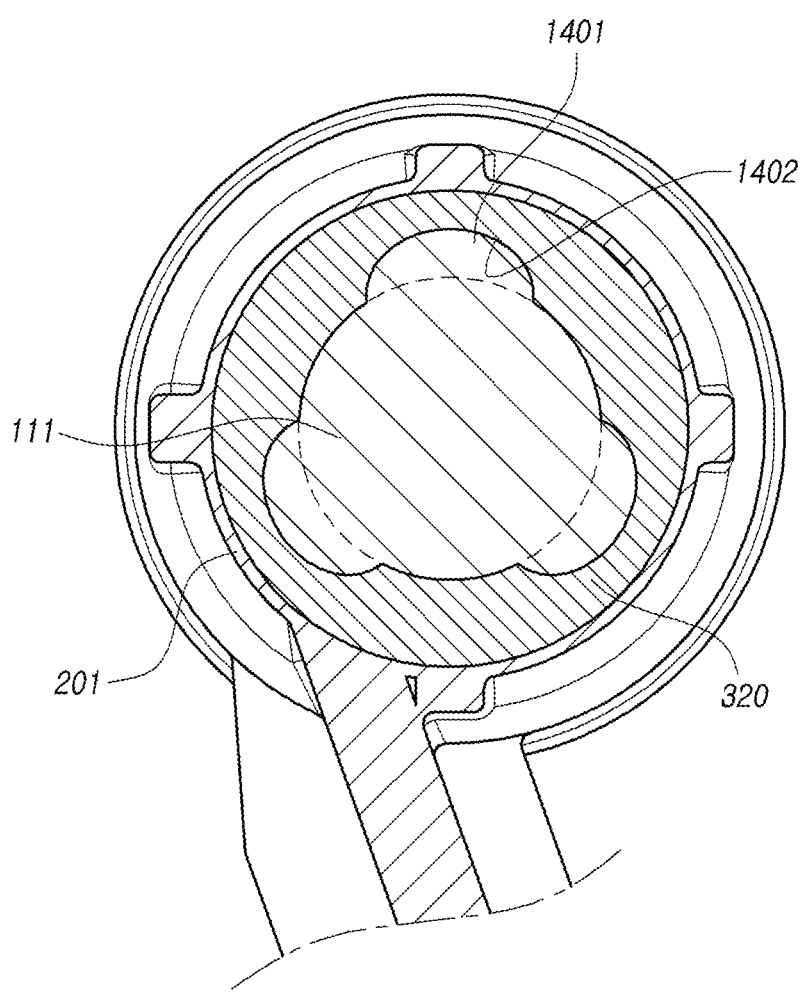
Figure 16:
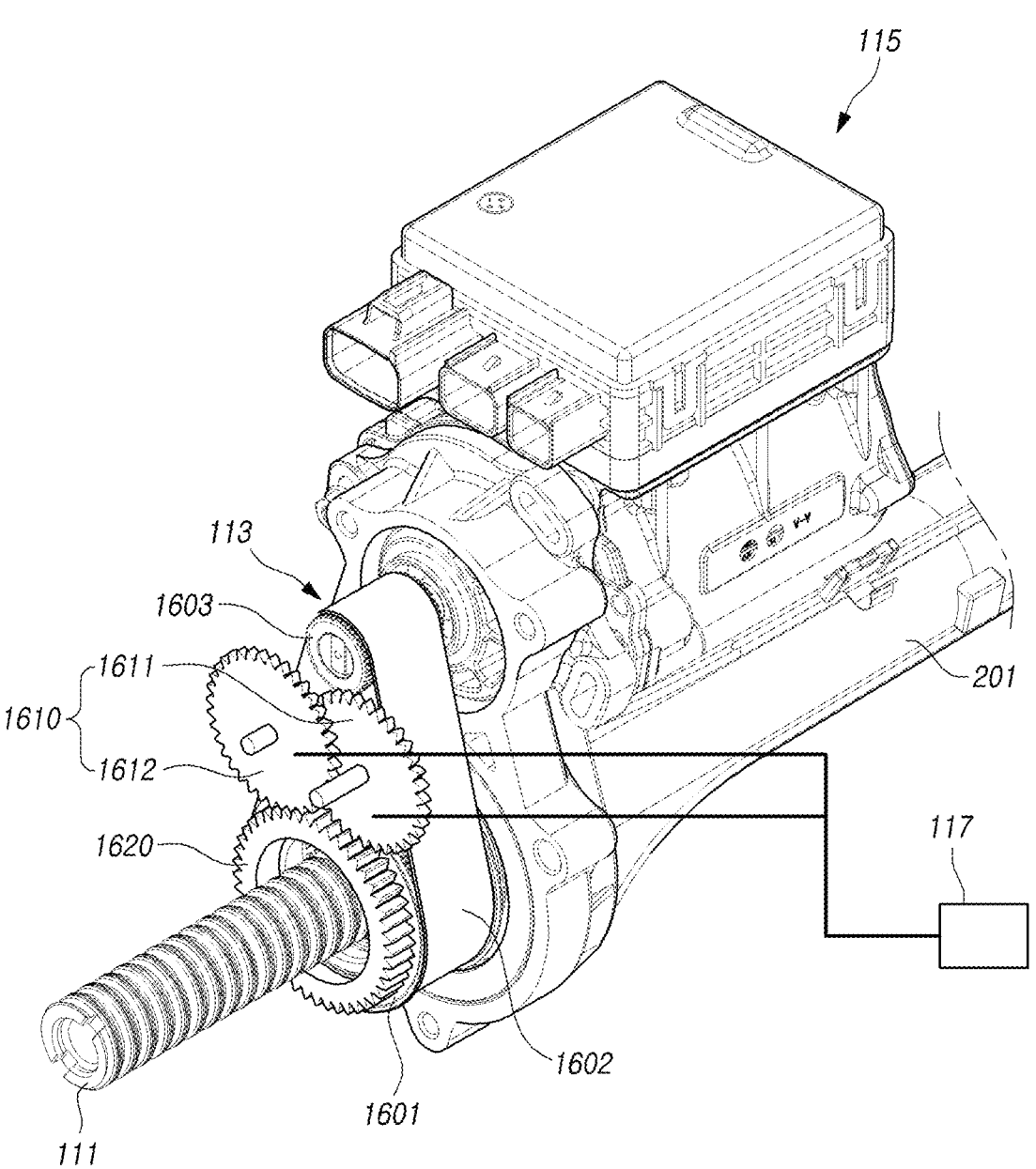
FIGS. 16 and 17 are perspective views illustrating a portion of a steer-by-wire steering device according to the present embodiments.
Figure 17:
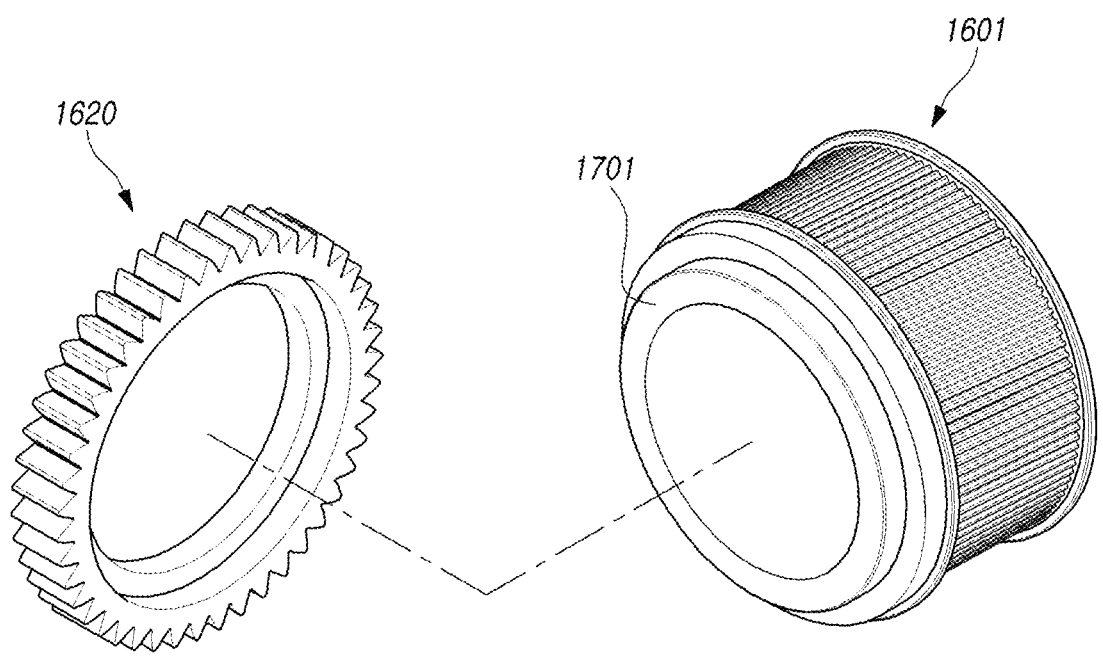

FIG. 1 is a view schematically illustrating a steer-by-wire steering device according to the present embodiments. FIG. 2 is a side view illustrating a steer-by-wire steering device according to the present embodiments. FIG. 3 is an exploded perspective view illustrating a portion of a steer-by-wire steering device according to an embodiment. FIGS. 4 and 5 are cross-sectional views illustrating a steer-by-wire steering device according to an embodiment. FIG. 6 is an exploded perspective view illustrating a portion of a steer-by-wire steering device according to an embodiment. FIGS. 7 and 8 are cross-sectional views illustrating a steer-by-wire steering device according to the present embodiments. FIG. 9 is an exploded perspective view illustrating a portion of a steer-by-wire steering device according to an embodiment. FIGS. 10 and 11 are cross-sectional views illustrating a steer-by-wire steering device according to the present embodiments. FIG. 12 is an exploded perspective view illustrating a portion of a steer-by-wire steering device according to an embodiment. FIG. 13 is a cross-sectional view illustrating a steer-by-wire steering device according to the present embodiments. FIGS. 14 and 15 are cross-sectional views illustrating a steer-by-wire steering device according to an embodiment. FIGS. 16 and 17 are perspective views illustrating a portion of a steer-by-wire steering device according to the present embodiments.

According to the present embodiments, a steer-by-wire steering device includes a sliding bar 111 provided to be axially slidable in a housing 201, a motor 115 connected with the sliding bar 111 by a gear box 113, and an anti-rotation member 119 formed with a hollow, circumferentially supported by the sliding bar 111, and coupled to an inner circumferential surface of the housing 201.

First, referring to FIG. 1, according to the present embodiments, in the steer-by-wire steering device 100, an angle sensor 105 and a torque sensor 107 are provided to a steering shaft 103 connected with a steering wheel 101. The angle sensor 105 and the torque sensor 107 detect the driver's manipulation of the steering wheel 101 and transmits an electrical signal to an electronic control unit 110. The electronic control unit 110 drives a steering shaft motor 109 coupled to the steering shaft 103 and a motor 115 connected with the sliding bar 111 based on the received electrical signal.

The electronic control unit 110 controls the steering shaft motor 109 and the motor 115 based on the electrical signals received from several sensors mounted to the vehicle, as well as the torque sensor 107 and the angle sensor 105. For example, the electronic control unit 110 may receive steering information from, e.g., a motor position sensor, various radar, lidar, or camera video sensors.

The steering shaft motor 109 applies a reaction force torque in the direction opposite to the driver's steering torque when the driver manipulates the steering wheel 101, increasing the driver's driving sensation or, upon autonomous driving, rotate the steering shaft 103 to steer the vehicle.

The rotational force of the motor 115 may be transferred to the sliding bar 111 by the gear box 113 to slide it axially. A tie rod 121 and a knuckle arm 123 are coupled to the sliding bar 111 and, as the sliding bar 111 axially slides in the housing 201, the wheel 125 is steered.

In this case, for the sliding bar 111 to be axially slid by the rotational force of the motor 115, the sliding bar 111 should be prevented from rotating about the center axis of the sliding bar 111. Thus, according to the present embodiments, the steer-by-wire steering device 100 includes the anti-rotation member 119 that is formed with a hollow, is coupled to the inner circumferential surface of the housing 201, and is circumferentially supported by the sliding bar 111.

The conventional steer-by-wire steering device prevents rotation of the sliding bar by adopting the pinion shaft of the general rack-driven steering device and engage it with the rack gear formed on the sliding bar, thereby providing high compatibility with the production line and assembly line for general rack-driven steering devices. However, such a structure requires machining of a rack gear on the sliding bar and more parts, such as a support yoke, as well as a pinion shaft, resultantly increasing the number of parts and complicating the assembly process.

In other words, referring to FIG. 2, the conventional steer-by-wire steering device has the pinion shaft and the support yoke on the right of the figure. However, according to the present embodiments, the steer-by-wire steering device 100 has the anti-rotation member 119 to prevent rotation of the sliding bar 111 and thus does not require a pinion shaft 104, a support yoke, or the like, saving components. Further, as described below, the anti-rotation member 119 is axially assemblable, simplifying the assembly process and significantly saving costs.

Meanwhile, since the steer-by-wire steering device lacks a mechanical connection between the steering wheel 101 and the wheel 125, it requires detection of the moving position of the sliding bar 111 to determine, e.g., whether the sliding bar 111 is slid by the extent corresponding to the driver's manipulation of the steering wheel 101. The steer-by-wire steering device 100 according to the present embodiments has a sensor 117 to detect rotation information from the gear box 113 and thereby detects the moving position of the sliding bar 111.

In other words, the conventional steer-by-wire steering device detects the moving position of the rack bar from rotation information from the pinion shaft. However, the steer-by-wire steering device 100 according to the present embodiments lacks a pinion shaft and thus detects rotation information from the gear box 113 connecting the motor 115 and the sliding bar 111. This is described below in detail.

The combined structure of the sliding bar 111, anti-rotation member 119, and housing 201 is described below.

The anti-rotation member 119 may include a supporting member 320 coupled to the inner circumferential surface of the housing 201 and a bushing member 310 coupled to the supporting member 320 and circumferentially supported by the sliding bar 111 (see FIGS. 3 to 11).

The supporting member 320 is formed with a hollow and coupled to the housing 201, with its outer circumferential surface supported on the inner circumferential surface of the housing 201. The housing 201 has a step portion 511 formed in the inner circumferential surface, and the supporting member 320 is supported by the step portion 511.

Further, a fixing member 512 supported by the supporting member 320 on the opposite side of the step portion 511 is coupled to the inner circumferential surface of the housing 201, so that the supporting member 320 is axially fixed between the step portion 511 and the fixing member 512. As the fixing member 512, e.g., a noise damper or snap ring may be used.

Further, the supporting member 320 is axially inserted into the inside of the housing 201 and may be, e.g., screwed, and supported by the fixing member 512 and prevented from being released.

A first flat portion 301 is formed on the outer circumferential surface of the sliding bar 111 and a second flat portion 311 supported on the first flat portion 301 is formed on the inner circumferential surface of the bushing member 310, so that the bushing member 310 may be circumferentially supported by the sliding bar 111, and the sliding bar 111 may thus axially slide without rotation.

There may be provided one or at least two first flat portions 301 and second flat portions 311. FIGS. 3 to 5 illustrate an embodiment in which four first flat portions 301 are formed, and the sliding bar 111 is shaped substantially as a rectangular pillar, or FIGS. 6 to 11 illustrate an embodiment in which one first flat portion 301 is formed.

As shown in the drawings, the first flat portion 301 is formed from an end of the sliding bar 111, so that the anti-rotation member 119 including the bushing member 310 and the supporting member 320 may be axially slide from the end of the sliding bar 111 and may simply be assembled.

Further, to reduce friction between the outer circumferential surface of the sliding bar 111 and the inner circumferential surface of the bushing member 310, the bushing member 310 may be formed of a low-friction material, such as Teflon, or preferably formed of a component, such as a dry bearing or DU bushing.

As described above, the bushing member 310 is circumferentially fixed to the supporting member 320 or the housing 201, which is described below in connection with embodiments.

First, referring to FIGS. 3 to 5, insertion portions 312 may protrude from the outer circumferential surface of the bushing member 310, and insertion grooves 321, into which the insertion portions 312 are fitted into, may be depressed from the inner circumferential surface of the supporting member 320.

As shown in the drawings, the insertion grooves 321 are formed to be axially open, allowing the bushing member 310 and the supporting member 320 to be axially assembled.

Further, there may be provided one or at least two insertion portions 312 and insertion grooves 321, and the drawings illustrate an embodiment in which four insertion portions 312 and four insertion grooves 321 are provided.

However, as described above, the number of first flat portions 301 and the number of second flat portions 311 may differ, and the numbers of the insertion portions 312 and insertion grooves 321 are not limited thereto or thereby.

Since the insertion portions 312 are fitted into the insertion grooves 321 and the bushing member 310 is circumferentially fixed, the first flat portion 301 and the second flat portion 311 are supported, preventing rotation of the sliding bar 111.

Further, as the inner circumferential surface of the supporting member 320 is stepped, one side of the bushing member 310 is axially supported, and the other side of the bushing member 310 is axially supported by the step portion 511 of the housing 201, so that the bushing member 310 may be axially fixed to the supporting member 320.

Referring to FIGS. 6 to 8, a third flat portion 611 may be formed on the outer circumferential surface of the bushing member 310, and a fourth flat portion 612 supported by the third flat portion 611 may be formed on the inner circumferential surface of the supporting member 320.

In other words, like the first flat portion 301 and the second flat portion 311 are supported by each other and the sliding bar 111 is circumferentially supported by the bushing member 310, the third flat portion 611 and the fourth flat portion 612 are supported by each other, and the bushing member 310 is circumferentially supported by the supporting member 320.

As shown in the drawings, the second flat portion 311 and the third flat portion 611 of the bushing member 310 may be formed on the same side.

Likewise, as the inner circumferential surface of the supporting member 320 is stepped, one side of the bushing member 310 may be axially supported, and the other side of the bushing member 310 may be axially supported by the step portion 511 of the housing 201. However, the anti-rotation member 119 may include a coupling member 620 coupled to the inner circumferential surface of the supporting member 320 and supported on the other side of the bushing member 310, so that the bushing member 310 may be axially fixed to the supporting member 320.

Next, referring to FIGS. 9 to 11, protrusions 911 may protrude from the outer circumferential surface of the bushing member 310, and the step portion 511 may have depressions 1001, into which the protrusions 911 are axially fitted, formed to be depressed.

In other words, as the bushing member 310 is fitted over the outer circumferential surface of the sliding bar 111, and the protrusions 911 are seated in the depressions 1001, the bushing member 310 is circumferentially fixed to the housing 201, not to the supporting member 320.

There may be provided one or at least two protrusions 911 and depressions 1001, and the drawings illustrate an embodiment in which three protrusions and three depressions are provided.

Since the protrusions 911 are fitted into the depressions 1001, the supporting member 320 supported by the step portion 511 may be supported on the rear surfaces of the protrusions 911, and the supporting member 320 is axially fixed to the housing 201 by the fixing member 512, so that the bushing member 310 is also axially fixed.

As described above, the anti-rotation member 119 includes the supporting member 320 and the bushing member 310, thereby preventing rotation of the sliding bar 111. Thus, it is possible to allow for simplified assembly with fewer components, as compared with when a pinion shaft is provided.

Meanwhile, referring to FIGS. 12 and 13, the anti-rotation member 119 may be coupled to the sliding bar 111 by serrations, preventing rotation of the sliding bar 111.

In other words, a first serration 1201 is formed on the outer circumferential surface of the sliding bar 111, and a second serration 1202, which is engaged with the first serration 1201, is formed on the inner circumferential surface of the anti-rotation member 119. Thus, the sliding bar 111 axially slides while being prevented from circumferential rotation by the first serration 1201 and the second serration 1202.

As compared with the embodiment in which the anti-rotation member 119 includes the supporting member 320 and the bushing member 310, the embodiment in which the anti-rotation member 119 is coupled with the sliding bar 111 by the first serration 1201 and the second serration 1202 requires serrating but, in light of no need for processing for the protrusions 911 and insertion portions 312, provides for simplicity.

Meanwhile, referring to FIGS. 14 and 15, convex portions 1401, axially elongated, are provided on the outer circumferential surface of the sliding bar 111, and concave portions 1402, into which the convex portions 1401 are inserted, are formed in the inner circumferential surface of the anti-rotation member 119, thereby preventing rotation of the sliding bar 111.

In other words, a portion of the sliding bar 111, which is not coupled with the anti-rotation member 119, is formed to have a circular cross section (refer to the dashed line of the drawings), and a portion thereof, coupled with the anti-rotation member 119, has the convex portions 1401 protruding from the outer circumferential surface. The convex portions 1401 are inserted into the concave portions 1402, which are depressed from the inner circumferential surface of the anti-rotation member 119, preventing rotation of the sliding bar 111.

Further, there may be provided one or two or more convex portions 1401 and concave portions 1402. Although not shown in the drawings, the convex portions 1401 may protrude from any one side of the sliding bar 111. Or, two convex portions 1401 may be provided so that the sliding bar 111 is formed substantially in an elliptical shape, or there may be provided more convex portions 1401 equi-spaced along the circumference.

Meanwhile, as described above, according to the present embodiments, the steer-by-wire steering device 100 further includes a sensor 117 that detects rotation information from the gear box 113 connecting the motor 115 with the sliding bar 111 and detects the moving position of the sliding bar 111 based on the detected rotation information.

Referring to FIGS. 16 and 17, the gear box 113 may include a nut pulley 1601 that rotates in conjunction with the sliding bar 111. In other words, the gear box 113 may further include a ball nut coupled to a screw formed in the sliding bar 111, a motor pulley 1603 coupled to the motor shaft of the motor 115, and a belt 1602 to connect the motor pulley 1603 with the nut pulley 1601.

The structure in which the rotational force of the motor 115 is transferred to the sliding bar 111 by the nut pulley 1601 is known, and no detailed description thereof is given.

In this case, the sensor 117 includes a first gear 1610 that rotates in conjunction with the nut pulley 1601. The sensor 117 may detect rotation information from the first gear 1610 and detect the moving position of the sliding bar 111.

In other words, since the nut pulley 1601 is rotated with a predetermined reduction ration for the axial sliding distance of the sliding bar 111, the sensor 117 may be able to detect the moving position of the sliding bar 111 based on the rotation information detected from the nut pulley 1601.

The sensor 117 is able to detect rotation information from the motor pulley 1603, belt 1602, or ball nut in addition to the nut pulley 1601. However, given a slip between the motor pulley 1603 or the nut pulley 1601 and the belt 1602 and that the ball nut is provided inside the nut pulley 1601, it is preferable to detect rotation information from the nut pulley 1601, rather than from the motor pulley 1603, belt 1602, or ball nut.

For the first gear 1610 to rotate in conjunction with the nut pulley 1601, the nut pulley 1601 may have an extension 1701 that axially protrudes, and a second gear 1620 engaged with the first gear 1610 may be coupled to the outer circumferential surface of the extension 1701.

In other words, although not shown, the second gear 1620 is coupled to the extension 1701 by, e.g., serrations and is circumferentially fixed to the nut pulley 1601, so that the first gear 1610 is rotated in conjunction with the nut pulley 1601, and the sensor 117 is able to detect the rotation information of the nut pulley 1601 from the first gear 1610.

The sensor 117 may detect the absolute angle or phase angle of the first gear 1610. When the sensor 117 detects the absolute angle of the first gear 1610, the sensor 117 may be able to detect the moving position of the sliding bar 111 although the first gear 1610 is configured as a single gear alone. When the sensor 117 detects the phase angle of the first gear 1610, the first gear 1610 may include two gears 1611 and 1612 having different diameters to detect the moving position of the sliding bar 111.

In other words, the rotation information detected from the first gear 1610 includes first rotation information and second rotation information detected from the gears 1611 and 1612, respectively, and the gears 1611 and 1612 have different diameters and thus have different reduction ratios for the sliding distance of the sliding bar 111. Thus, the sensor 117 detects the moving position of the sliding bar 111 based on the phase difference between the first rotation information and the second rotation information.

For example, the sensor 117 may determine the moving position of the sliding bar 111 from the phase difference between the first rotation information and the second rotation information and the number of times in which the phase difference becomes zero.

$$R = \frac{K}{360} \times \theta + K \times n \qquad \text{[Equation 1]}$$

R denotes the moving position of the sliding bar 111, $\theta$ the phase difference between the first rotation information and the second rotation information, K the moving distance of the sliding bar 111 while the sliding bar 111 slides to one side so that the phase difference between the first rotation information and the second rotation information changes from 0 back to 0, and n the number of times in which while the sliding bar 111 slides to one side, the phase difference between the first rotation information and the second rotation information becomes 0.

In other words, as the sliding bar 111 slides, the phase difference between the first rotation information and the second rotation information increases or decreases. The sliding distance of the sliding bar 111 until the phase difference between the first rotation information and the second rotation information becomes 0 and comes back to 0 may be previously calculated and, based thereupon, the moving position of the sliding bar 111 may be determined.

Accordingly, the steer-by-wire steering device 100 according to the present embodiments, although having no pinion shaft, may detect the moving position of the sliding bar 111 by detecting rotation information from the gear box 113.

The so-shaped steer-by-wire steering device may reduce the number of components, simplify the assembly process, and significantly save costs by implementing, with a simpler structure, preventing rotation of the sliding bar and determining the moving position of the sliding bar to allow the sliding bar to axially slide by the torque of a motor.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

The instant patent application is the national stage of International Patent Application No. PCT/KR2020/012298 filed on Sep. 11, 2020, which claims priority under 35 U.S.C. 119 (a) to Korean Patent Application No. 10-2019-0113877, filed on Sep. 17, 2019, in the Korean Intellectual Property Office, the disclosures of which are herein incorporated by reference in their entireties. The present patent application claims priority to other applications to be filed in other countries, the disclosures of which are also incorporated by reference herein in their entireties.

The invention claimed is:

1. A steer-by-wire steering device, comprising:
a sliding bar provided to be axially slidable in a housing;
a motor connected with the sliding bar by a gear box; and
an anti-rotation member formed with a hollow, circumferentially supported by the sliding bar, and coupled to an inner circumferential surface of the housing; and
a sensor configured to detect rotation information from the gear box and detect a linear movement position of the sliding bar based on the rotation information,
wherein the gear box includes a nut pulley configured to be rotatable in conjunction with linear movement of the sliding bar, and wherein the sensor includes a first gear configured to be rotatable in conjunction with the nut pulley and is configured to detect the rotation information from the first gear.

2. The steer-by-wire steering device of claim 1, wherein the anti-rotation member includes a supporting member coupled to the inner circumferential surface of the housing and a bushing member coupled to the supporting member and circumferentially supported by the sliding bar.

3. The steer-by-wire steering device of claim 2, wherein the inner circumferential surface of the housing has a step portion to allow the supporting member to be supported by the step portion.

4. The steer-by-wire steering device of claim 3, wherein a fixing member supported by the supporting member on an opposite side to the step portion is coupled to the inner circumferential surface of the housing.

5. The steer-by-wire steering device of claim 3, wherein an outer circumferential surface of the sliding bar has a first flat portion, and an inner circumferential surface of the bushing member has a second flat portion supported by the first flat portion.

6. The steer-by-wire steering device of claim 5, wherein at least two first flat portions and at least two second flat portions are provided.

7. The steer-by-wire steering device of claim 5, wherein an insertion portion protrudes from an outer circumferential surface of the bushing member, and an insertion groove into which the insertion portion is inserted is depressed from an inner circumferential surface of the supporting member.

8. The steer-by-wire steering device of claim 7, wherein at least two insertion portions and at least two insertion grooves are provided.

9. The steer-by-wire steering device of claim 5, wherein an outer circumferential surface of the bushing member has a third flat portion, and an inner circumferential surface of the supporting member has a fourth flat portion supported by the third flat portion.

10. The steer-by-wire steering device of claim 5, wherein a protrusion protrudes from an outer circumferential surface of the bushing member, and a depression into which the protrusion is axially inserted is depressed from the step portion.

11. The steer-by-wire steering device of claim 10, wherein at least two protrusions and at least two depressions are provided.

12. The steer-by-wire steering device of claim 1, wherein an outer circumferential surface of the sliding bar has a first serration, and an inner circumferential surface of the anti-rotation member has a second serration engaged with the first serration.

13. The steer-by-wire steering device of claim 1, wherein the outer circumferential surface of the sliding bar has an axially elongated convex portion, and an inner circumferential surface of the anti-rotation member has a concave portion into which the convex portion is inserted.

14. The steer-by-wire steering device of claim 13, wherein at least two convex portions and at least two concave portions are formed.

15. The steer-by-wire steering device of claim 1, wherein the nut pulley has an extension axially protruding, and wherein the extension has an outer circumferential surface coupled with a second gear engaged with the first gear.

16. The steer-by-wire steering device of claim 15, wherein the first gear includes two gears having different diameters.

17. The steer-by-wire steering device of claim 1, wherein the rotation information from the first gear corresponds to an absolute angle of a rotation of the first gear or the nut pulley.

\* \* \* \* \*